Patented Nov. 21, 1944

2,363,091

UNITED STATES PATENT OFFICE 2,363,091

PREPARATION OF CELLULOSE ESTERS

George W. Seymour and Blanche B. White, Cumberland, Md., assignors to Celanese Corporation of America, a corporation of Delaware No Drawing. Application April 23, 1942,
Serial No. 440,204

5 Claims. (Cl. 260—225)

This invention relates to the preparation of organic esters of cellulose, and relates more particularly to the preparation of mixed organic esters of cellulose.

An object of our invention is the preparation of organic esters of cellulose containing both the acetyl and formyl groups.

Another object of our invention is the preparation of said organic esters of cellulose employing the mixed anhydride of formic and acetic acid.

Still another object of our invention is the preparation of cellulose acetate-formates having varying proportions of combined acetic and formic acid in the molecular structure thereof.

Yet another object of our invention is a process for making said mixed esters of cellulose in but a single operation.

Other objects of our invention will appear from the following detailed description.

In the preparation of mixed organic esters of cellulose containing the acyl radicals of more than one acid, various processes have been employed. By one process, the cellulose was first partially esterified by means of one esterifying agent and, after this esterification reaction, the remaining free hydroxy groups are esterified with another esterifying agent to give the desired mixed ester. In accordance with another process, cellulose was first esterified and part of the ester groups so introduced into the cellulose molecule were then replaced by treatment of said cellulose ester with another esterifying medium. Some of the original acyl groups are split off and esterification with the second esterifying medium takes place. By yet another process, whereby a product containing more than one type of acyl radical was obtained, such product was obtained by physically mixing different cellulose esters in the desired proportions and then employing such mixture for the manufacture of various products. Such esters were not true chemical compounds, however, but mere physical mixtures and, as such, did not possess properties which were substantially different from those of each of the cellulose esters in the mixture. The preparation of mixed esters of cellulose has also been effected by employing two different esterifying agents and carrying out the esterification reaction with each agent simultaneously.

We have now discovered that mixed organic esters of cellulose containing both formyl and acetyl radicals in the molecule and in any desired relative proportions may be prepared by esterifying cellulose with formic-acetic anhydride in the presence of a suitable esterification catalyst. Catalysts which may be employed in accordance with the esterification process of our invention are hydrochloric acid, phosphoric acid, $ZnCl_2$, $P_2O_5$ and sulfuric acid, but we preferably employ the latter.

The quantity of catalyst employed in carrying out our esterification process may vary. Desirable results may be obtained when as little as 0.5%, on the weight of the cellulose, is employed, but the catalyst present during the reaction may be as much as 11% or even 30%. The reaction proceeds substantially independently of the amount of catalyst employed insofar as the amount of esterification is concerned. However, we have found that by varying the quantity of catalyst present, as more fully described hereinafter, we may control the ratio of combined formyl to that of combined acetyl in the resulting cellulose ester. In any case, however, the quantity of catalyst should preferably be substantially within the range specified.

In carrying out our novel process we have found it to be advantageous to employ a diluent during the esterification reaction. Diluents such as acetic acid, formic acid, mixtures of acetic acid and formic acid, benzol, carbon tetrachloride, and toluol have been found to be satisfactory. The choice of a suitable diluent is of importance since it has a pronounced effect on the resultant cellulose ester. Thus, for example, we have found that when employing formic acid as a diluent, we may thereby obtain cellulose acetate-formates containing a preponderance of combined formyl radical, while, on the other hand, when acetic acid is employed as diluent, the resulting cellulose acetate-formate contains a preponderance of combined acetyl radical. By suitably adjusting the conditions under which the reaction is carried out, such, for example, as the mol ratio of formic-acetic anhydride employed to that of the diluent, i. e., formic acid, acetic acid or mixtures thereof, cellulose acetate-formates of varying properties and containing varying amounts of combined formyl and acetyl radicals may be obtained. Likewise, in the case where formic acid is employed as the diluent, increasing the quantity of catalyst employed tends to increase the ratio of combined formyl radical to that of combined acetyl in the resulting cellulose ester. By carrying out our novel esterification process in this manner, cellulose acetate-formates having an acetyl value of from 1 up to 43% and formyl values of from 22 down to 8% may be prepared, as well as cellulose acetate-formates of various intermediate formyl and acetyl values.

Formic-acetic anhydride suitable for use in accordance with our invention may be prepared conveniently by adding formic acid to acetic anhydride. The temperature of the mixture is raised gradually to about 50° C. and maintained at that temperature until the reaction is completed, usually in about one hour. The resulting product comprises a solution of formic-acetic anhydride in acetic acid. The pure anhydride may be obtained by fractionation under vacuum, the boiling point being 31 to 32° C. at 16 mm. An extraction process may also be employed utilizing an extractant in which one of the components of the mixture is soluble and the other insoluble. For the preparation of cellulose acetate-formates in accordance with our invention, the purified formic-acetic anhydride may then be diluted as desired.

The cellulosic materials esterified in accordance with our process may be any suitable form of cellulose or cellulose derivative. It may be cotton, cotton linters, wood-pulp, regenerated cellulose, or other cellulosic material obtainable from various other sources such as grasses, straws, hulls and the like.

The cellulosic materials may, if desired, be pretreated prior to esterification in order to render them more reactive. Such pretreatment may comprise treating the cellulosic materials with acetic acid or formic acid, or mixtures of these acids. The acid or acids may be present in a small amount, for example, 1% to 50% of the weight of the cellulosic material, or in much larger quantities, for example, 100%, 200% or even 300% of the weight of the cellulosic material. The acid mixture employed for pretreatment may also contain a small quantity of sulfuric acid, for instance, ½% to 1 or 2% or more on the weight of the cellulosic material. The pretreatment is preferably allowed to go on for some hours, for example, 4 to 24 hours and the amount of acetic acid and/or formic acid then adjusted to the desired value, the formic-acetic anhydride and catalyst added in appropriate amount, and the esterification carried out.

In order further to illustrate our invention, but without being limited thereto, the following examples are given:

*Example I*

170 parts by weight of cotton linters are esterified with 521 parts of formic-acetic anhydride, 0.85 part of sulfuric acid, and 511 parts of acetic acid. The time of esterification is 24 hours during which time the mixture is allowed to attain a peak temperature of 30° C. After the esterification is completed water is added gradually to the swollen and gelatinized mixture with stirring in order to break the mass into small granules. The product is then washed and dried in the usual manner. The resulting cellulose acetate-formate has an acetyl value of 27.2% and a formyl value of 21.5%, each value calculated as the corresponding acids.

*Example II*

170 parts by weight of cotton linters are esterified with 888 parts of formic-acetic anhydride, 1.7 parts of sulfuric acid and 897 parts of acetic acid. The esterification is carried out for 7 hours with a peak temperature of 30° C. being reached during the reaction. After completion of the esterification water is added, with stirring, and the granular mass obtained is washed and dried. The resulting cellulose acetate-formate has an acetyl value of 43.2% and a formyl value of 13%, calculated as the corresponding acids.

*Example III*

170 parts by weight of cotton linters are esterified with 352 parts of formic-acetic anhydride, 18.7 parts of sulfuric acid and 463.7 parts of formic acid. The esterification is carried out for 24 hours and a peak temperature of 30° C. is reached. When the reaction is completed, water is added, with stirring, and the granular mass obtained is washed and dried. The resulting cellulose acetate-formate has an acetyl value of 1.2% and a formyl value of 20.0%, each calculated as the corresponding acids.

*Example IV*

170 parts by weight of regenerated cellulose obtained by the viscose process is esterified with 405 parts of formic-acetic anhydride, 18.7 parts of sulfuric acid and 533 parts of formic acid. The esterification is carried out for 24 hours and a peak temperature of 30° C. is reached. After the esterification water is added, with stirring, and the granular mass obtained is washed and dried. The resulting cellulose acetate-formate has an acetyl value of 1.8% and a formyl value of 37.6%, calculated as the corresponding acids.

It is to be understood that the foregoing detailed description is merely given by way of illustration and that many variations may be made therein without departing from the spirit of our invention.

Having described our invention, what we desire to secure by Letters Patent is:

1. Process for the preparation of mixed esters of cellulose containing both the formyl and acetyl radicals, which comprises esterifying cellulose with formic-acetic anhydride prepared by reacting formic acid with acetic anhydride in the presence of sulfuric acid as esterification catalyst.

2. Process for the preparation of mixed esters of cellulose containing both the formyl and acetyl radicals, which comprises esterifying cellulose with formic-acetic anhydride prepared by reacting formic acid with acetic anhydride in the presence of sulfuric acid as esterification catalyst and a diluent.

3. Process for the preparation of mixed esters of cellulose containing both the formyl and acetyl radicals, which comprises esterifying cellulose with formic-acetic anhydride prepared by reacting formic acid with acetic anhydride in the presence of sulfuric acid as esterification catalyst and formic acid.

4. Process for the preparation of mixed esters of cellulose containing both the formyl and acetyl radicals, which comprises esterifying cellulose with formic-acetic anhydride prepared by reacting formic acid with acetic anhydride in the presence of sulfuric acid as esterification catalyst and acetic acid.

5. Process for the preparation of mixed esters of cellulose containing both the formyl and acetyl radicals, which comprises esterifying cellulose with formic-acetic anhydride prepared by reacting formic acid with acetic anhydride in the presence of sulfuric acid as esterification catalyst and a mixture of formic acid and acetic acid.

GEORGE W. SEYMOUR.
BLANCHE B. WHITE.